United States Patent

[11] 3,568,890

| [72] | Inventor | Thomas S. Leachman |
| | | 3608 Volcanic Ave, El Paso, Tex. 79904 |
| [21] | Appl. No. | 858,755 |
| [22] | Filed | Sept. 17, 1969 |
| [45] | Patented | Mar. 9, 1971 |

[54] HEADREST-LIQUID CONTAINER
7 Claims, 10 Drawing Figs.

[52] U.S. Cl............................................... 222/183,
297/391, 222/192
[51] Int. Cl.............................................. B67d 5/06
[50] Field of Search........................................ 297/391;
222/183, 192

[56] References Cited
UNITED STATES PATENTS
| 2,404,109 | 7/1946 | Steele........................... | 297/391X |
| 3,437,374 | 4/1969 | Bennett......................... | 297/391 |
| 3,449,011 | 6/1969 | Edwards et al. .............. | 297/391 |

*Primary Examiner*—Robert B. Reeves
*Assistant Examiner*—Thomas E. Kocovsky
*Attorney*—Robert G. McMorrow ABSTRACT: A headrest-liquid container in which a substantially cylindrical container, having filling and spigot means, is encased in a protective pad, and has brackets extending through the pad for seat back engagement. The container may be supplied with pivotal legs for use apart from the headrest function.

PATENTED MAR 9 1971
3,568,890
SHEET 1 OF 2
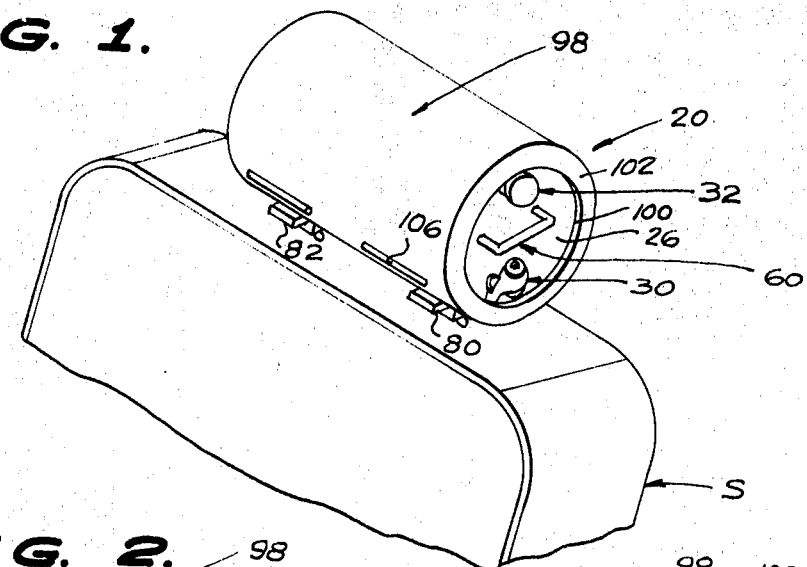
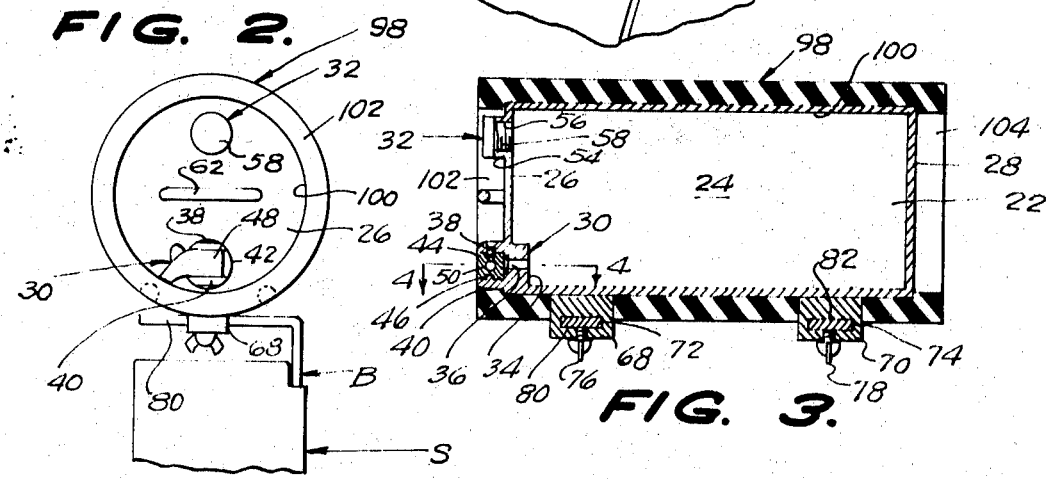
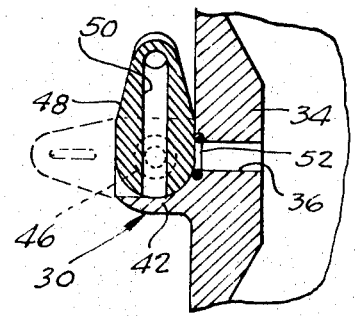
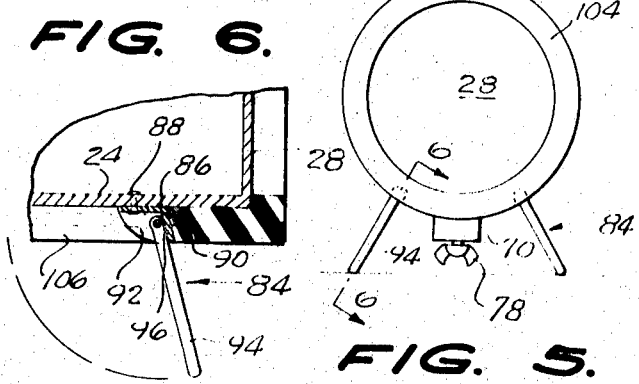
INVENTOR.
THOMAS S. LEACHMAN,
BY
Robert G. McMorrow
ATTORNEY.

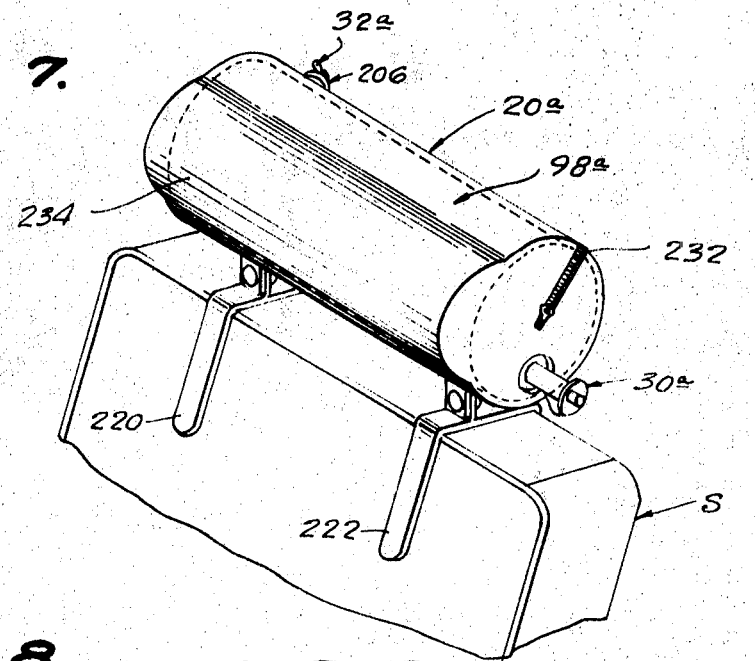
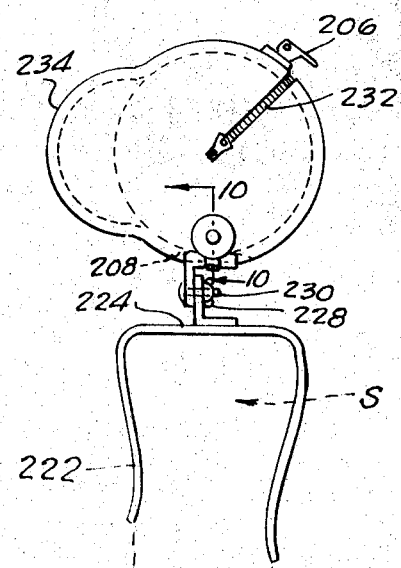
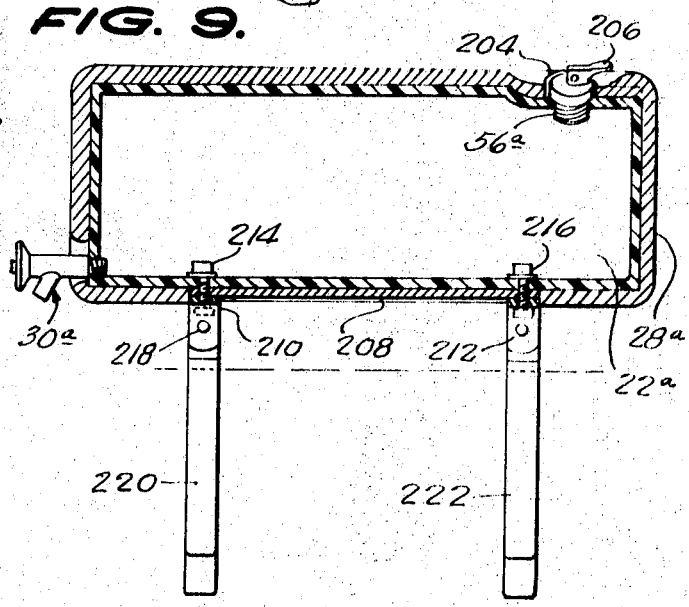
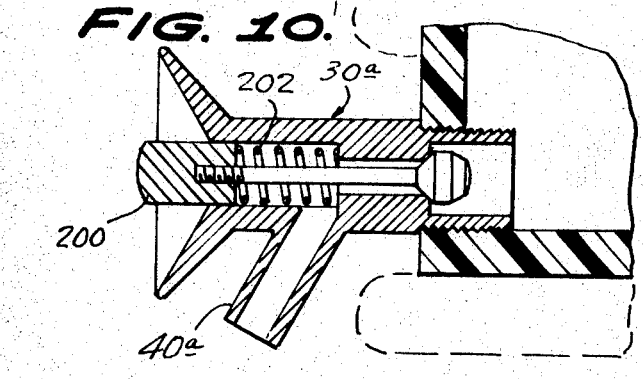

HEADREST-LIQUID CONTAINER

BACKGROUND OF THE INVENTION

1. Field of the Invention

This invention relates to a new and novel article of manufacture in which a vehicle headrest is combined with a liquid container.

2. Statement of the Prior Art

It has heretofore been proposed to mount various items within vehicle headrests. Such items have included radio speakers, purses, and the like.

SUMMARY OF THE INVENTION

The present invention contemplates the incorporation of a liquid container for beverages and the like in a vehicle headrest. A principal objective of the invention resides in the useful employment of the space within a vehicle headrest by the provision of a liquid container housed therein. The invention further contemplates the provision of a container and a surrounding pad, the pad functioning both as cushioning in the manner of a conventional headrest, and as insulation for the container whereby its liquid content is maintained at a uniform hot or cold temperature for extended periods of time.

This invention provides alternative connection means whereby the units are adapted for mounting in vehicles with existing headrest brackets, and to those vehicles having no such existing means.

It is a further object of the invention to provide a headrest-liquid container as aforesaid wherein, in one embodiment of the invention, optionally usable, foldable leg means is provided. Thus, the device may be detached from a vehicle and employed on a picnic table, or the like.

In another embodiment of the invention, the assembly includes the removable cover, having zipper closure means, whereby the liquid container may be removed completely from the cover and pad means thereof.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a perspective view of a seat back having a first form of headrest-liquid container in accordance with the invention in place thereon;

FIG. 2 is a side elevational view of the assembly of FIG. 1;

FIG. 3 is a medial cross-sectional view thereof;

FIG. 4 is an enlarged, detail view showing a form of dispensing spigot usable with the apparatus, in cross section taken substantially on the line 4-4 of FIG. 3, looking in the direction of the arrows;

FIG. 5 is an elevational view showing the device in use employing its optional leg means;

FIG. 6 is an enlarged detail sectional view of the leg means, taken substantially on the line 6-6 of FIG. 5, looking in the direction of the arrows;

FIG. 7 is a perspective view of a modified form of the invention;

FIG. 7 is a perspective view of a modified form of the invention;

FIG. 8 is an end elevational view of the second form of the invention;

FIG. 9 is a medial cross-sectional view thereof; and

FIG. 10 shows an alternative form of spigot employed with the assembly of FIG. 7.

DESCRIPTION OF THE PREFERRED EMBODIMENTS

Referring to the drawings in more detail, and initially to FIGS. 1 through 6 thereof, a first embodiment of the invention is therein shown and identified by reference numeral 20. The assembly 20, comprising a headrest-liquid container, includes, as a basic component thereof, en elongated, substantially cylindrical container 22 having a tubular main sidewall 24. The wall 24 is closed at each end by end walls 26, 28, respectively. The end wall 28 is imperforate, while the wall 26 includes liquid dispensing means 30 and filling means 32.

The dispensing means 30 of the first form of the invention comprises a noncomplex valve characterized by simplicity of design and ease of operation. The container wall 26 includes a boss portion 34 of increased thickness adjacent its lower extremity, the boss 34 having a passageway 36 formed therein and extending therethrough. The details of the valve are best shown in FIGS. 3 and 4, wherein it will be observed that upper and lower hinge walls 38, 40, respectively, extend outwardly of the wall 26, and a stop 42 also projects outwardly therefrom. Mounted between the hinge walls 38 and 40, on pivot hinges 44, 46, is a spigot member 48. The spigot member 48 has a liquid passage 50 therein which is adapted for alignment with the passageway 36 of the boss when the spigot is pivoted to the phantom line position of FIG. 4. When the spigot is positioned as shown in full lines in FIG. 4, the passageway 36 is effectively blocked, at an outer ring seal 52, thereby closing the spigot to liquid flow. Stop 42 functions to correctly locate the spigot for alignment of the passageway 36 and the passage 50.

The filling means 32 comprises a neck 54 defining a threaded opening 56 in the wall 26, and a threaded closure plug 58. The plug is removed by rotation to afford access to the container for the introduction of liquids, and for cleaning.

It is desirable that the container have a carrying handle. In the drawings, it will be noted that a U-formed handle means 60 is provided. The handle 60 comprises a bight portion 62, and arms, 64, 66, the latter being fixedly secured to the wall 26 of the container.

A pair of laterally spaced, substantially rectangular connector blocks 68, 70 are fixed to the wall 24 of the container. Each of the blocks has a rectangular slot 72, 74 formed therein, and an internally threaded bore. Screws with turning handles 76, 78 extend into the bores. The vehicle seat S has conventional L-shaped brackets B with forward arms 80, 82, and the arms are received in the slots 72 and 74. The screws are then clamped against the arms 80 and 82, thereby to releasably engage the device in place.

A further adjunct of the container comprises retractable and extendible legs, shown best in FIGS. 5 and 6 of the drawing. The legs, four of which are preferably supplied, are substantially identical, and only one is here described. Each leg assembly 84 comprises a mounting bracket with a top plate 86 secured, as by a rivet 88 to the wall 24, and having a backplate 90 limiting the extension of the leg, and sideplates 92. An elongated rod 94, comprising the leg per se is pivotally mounted on a cross pin 96 extending between the sideplates 92. Thus, the legs are pivotal from folded storage positions, as shown in phantom lines in FIG. 6, to depending support positions as indicated in FIG. 5.

Surrounding the container throughout substantially its entire length is a pad 98 of tubular form. The pad 98 has an inner surface 100, defining a cylindrical opening receiving the container 22, and the pad includes end portions 102, 104 which extend beyond the container end walls. The pad has longitudinal slits, as at 106, which permit pivotal movement of the container legs when it is in place. It will be observed, as in FIG. 3, that the pad is dimensioned to frictionally grip the container, thereby being tightly engaged in place thereabout. The pad is formed of a resilient material, such as foam rubber or the like, and is of sufficient resiliency to avoid harm to a vehicle occupants head if violently contacted thereby as in a collision or other automobile accident.

FIGS. 7 through 10 disclose an alternative embodiment of the invention designated 20a in the drawings. The device 20a is highly similar to the assembly 20, and corresponding elements are designated by the like reference numerals, the letter a being appended thereto for distinction. An elongated container 22a has a side wall 24a and end walls 26a, 28a. Mounted in the wall 26a is liquid dispensing means 30 comprising a valve and spigot of conventional design. The valve includes a plunger 200 normally biased outwardly to a closed position by a spring 202. Inward pressure on the plunger 200 opens the valve permitting liquid to flow outwardly through the spigot 48a in conventional form.

In this embodiment of the invention, the filling means 32a is preferably located on the side wall 24a. Such means comprises an opening 56a in the wall with a stopper 204 therein. The stopper 204 is of the type having a compressor mechanism to enlarge its diameter internally when inserted in the opening, the mechanism including a projecting lever 206.

Secured along the wall 24a at a location circumferentially spaced from the filling means is a mounting assembly including an elongated, wedge-shaped block member 208 of the configuration adapted to set the desired angle of the apparatus when in use. A pair of L-shaped brackets 210, 212 are secured to the block by screws 214, 216 which also extend through the wall 24a. Each of the brackets has an opening 218 on its depending end. As seen in FIG. 8, U-shaped spring arms 220, 222 are releasably engaged over the seat back S, and each has an L-shaped connecting bracket 224, 226 thereon. The brackets 224, 226 have slits 228 therein alignable with the openings 218 of the brackets 210 and 212. Changeable fasteners 230 extend through the aligned slits and openings to adjustably mount the container on the seat back.

A pad and cover 98a is formed of vinyl or similar material, and in its closed position envelopes the container providing both a protective and decorative covering therefor. The pad and cover has suitable openings for the filling means, the liquid dispensing means and the brackets, and has a zipper-type closure 232 whereby it is removable from the container. At the side thereof which is disposed in the direction of the head of the vehicle occupant, it is provided with a pad member 234 of increased depth, formed of foam rubber or similar resilient material, which enhances the protective properties of the headrest.

In operation, each of the headrest-liquid containers as above described may be employed for either hot or cold beverages as containers therefor. If the container per se is of appropriate material of fabrication, it may be frozen prior to incorporation in the pad and cover or pad, thus to provide very cold liquids upon partial thawing. Other uses and purposes of the device will occur to users, and the scope of this invention is defined in the appended claims.

I claim:

1. A headrest for seat back and a liquid dispensing container comprising:
   an elongated, substantially cylindrical liquid container having a tubular main side wall and opposite end walls;
   one of said end walls being imperforate and the other of said end walls having dispensing means associated therewith;
   means in one of said walls for filling the container with liquid;
   a tubular pad, defining a longitudinal passageway, the pad extending about the container and covering the container side walls;
   the pad being resilient to form a protective cover for the container; and
   connection means extending from the side wall through the pad, for engagement with bracket means on the seat, whereby the headrest and container is mounted above the seat back.

2. The invention of claim 1, and: foldable leg means on the container.

3. The invention of claim 1, and: a carrying handle on the container.

4. The invention of claim 1, wherein:
   the dispensing means comprises an opening in the other of said end walls; and
   a spigot member, having an outlet bore alignable with the opening, pivotally mounted on said last named wall adjacent the opening.

5. The invention of claim 4, wherein the means for filling the container comprises a removable plug member mounted in said other of said end walls.

6. The invention of claim 1, wherein the pad includes a cover having a zipper type closure thereabout.

7. The invention of claim 6, wherein the pad includes a forward portion of increased thickness.